US012147696B2

(12) United States Patent
Chaitanya et al.

(10) Patent No.: US 12,147,696 B2
(45) Date of Patent: Nov. 19, 2024

(54) GARBAGE COLLECTION FOR OBJECT-BASED STORAGE SYSTEMS

(71) Applicant: AMERICAN EXPRESS TRAVEL RELATED SERVICES COMPANY, INC., New York, NY (US)

(72) Inventors: Lakshman Chaitanya, Phoenix, AZ (US); Arindam Chatterjee, Phoenix, AZ (US); Pratap Singh Singh Rathore, Phoenix, AZ (US); Shourya Roy, Bangalore (IN); Nitish Sharma, Phoenix, AZ (US); Swatee Singh, Scottsdale, AZ (US); Mohammad Torkzahrani, Hoboken, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 18/528,024

(22) Filed: Dec. 4, 2023

(65) Prior Publication Data
US 2024/0103751 A1    Mar. 28, 2024

Related U.S. Application Data

(63) Continuation of application No. 17/160,843, filed on Jan. 28, 2021, now Pat. No. 11,861,206.

(51) Int. Cl.
*G06F 3/06* (2006.01)
(52) U.S. Cl.
CPC .......... *G06F 3/0652* (2013.01); *G06F 3/0608* (2013.01); *G06F 3/0659* (2013.01); *G06F 3/0673* (2013.01)

(58) Field of Classification Search
CPC .... G06F 3/0652; G06F 3/0608; G06F 3/0659; G06F 3/0673
See application file for complete search history.

(56) References Cited

U.S. PATENT DOCUMENTS

| | | | |
|---|---|---|---|
| 9,417,917 B1 | 8/2016 | Barber et al. | |
| 11,163,721 B1 | 11/2021 | Mahuli et al. | |
| 2006/0085489 A1* | 4/2006 | Tomic | G06F 12/123 |
| 2013/0238563 A1 | 9/2013 | Amarendran et al. | |
| 2017/0351611 A1 | 12/2017 | Ash et al. | |
| 2018/0276232 A1 | 9/2018 | Dhanasekaran et al. | |
| 2019/0108246 A1 | 4/2019 | Jois et al. | |
| 2019/0391932 A1 | 12/2019 | Gupta et al. | |
| 2021/0318834 A1 | 10/2021 | Kandiyanalluer et al. | |

* cited by examiner

*Primary Examiner* — Jae U Yu
(74) *Attorney, Agent, or Firm* — Sterne, Kessler, Goldstein & Fox P.L.L.C

(57) ABSTRACT

Disclosed are various embodiments for garbage collection for object-based storage systems. A first set of objects stored by an object storage service that have been accessed within a previously defined date range is identified. Then, a second set of objects stored by the object storage service is identified based at least in part on a relationship to one or more objects in the first set of objects. Next, a third set of objects stored by the object storage service that have been created prior to a predefined date is identified. Then, a subset of objects which are members of the third set of objects and not members of the first set of objects or the second set of objects is identified. Finally, a retention action is performed on individual members of the subset of objects based at least in part on a retention policy.

20 Claims, 4 Drawing Sheets

GARBAGE COLLECTION FOR OBJECT-BASED STORAGE SYSTEMS

CROSS-REFERENCE TO RELATED APPLICATIONS

This application is a continuation of U.S. Ser. No. 17/160,843, filed on Jan. 28, 2021 and titled "GARBAGE COLLECTION FOR OBJECT-BASED STORAGE SYSTEMS," the contents of which are herein incorporated by reference in its entirety.

BACKGROUND

As cloud computing grows in popularity, individuals and organizations continue to store larger and larger amounts of data in public cloud storage systems. However, while public cloud storage systems make it easy to store large amounts of data, they often fail to provide advanced tools or functionality to manage the lifecycle of data stored in the public cloud storage systems. As a result, if a user or an application relying on public cloud storage systems fails to delete or remove data stored in the public cloud storage systems, the data will continue to reside in the public cloud storage system indefinitely. This incurs not only additional costs, but also creates security risks because data abandoned or forgotten in the public cloud storage system could be compromised if the public cloud storage system suffers a security breach.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for performing garbage collection for data stored in object-based storage systems, such as those provided by public cloud storage systems. These approaches involve intelligently archiving or otherwise removing unused files or objects from object-based storage systems, such as cloud-based storage systems. As entities store data in cloud-based storage systems, costs increase as more data is stored. Accordingly, failure to remove data from the cloud-based storage system when there is no longer a need to store it in the cloud-based storage system consumes resources and incurs costs unnecessarily. Moreover, failing to remove data from the cloud-based storage system when there is no longer a need to store it creates security liabilities as the data could be accidentally disclosed in the event that the cloud-based storage provider suffers a security or data breach.

Although individual objects stored in a cloud-based storage system can be deleted or archived automatically if they have not been accessed within a predefined period of time, this can corrupt larger data structures formed from collections of individual objects. Indeed, the larger data structure could still be actively in use, even if individual objects that form the data structure have not been accessed within the predefined period of time. Accordingly, various embodiments of the present disclosure identify objects that may be candidates for deletion or archival based on the last time they were accessed, but are related to larger data structures that are still in active use. As a result, various embodiments of the present disclosure are able to delete or archive unused objects stored in a cloud-based storage system without corrupting larger data structures that may include unused objects. This can both improve the efficiency of cloud-based storage systems by minimizing the amount of data stored on the cloud-based storage systems and improve the security of data stored in cloud-based storage systems by limiting the amount of time the data is stored in the cloud-based storage systems.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
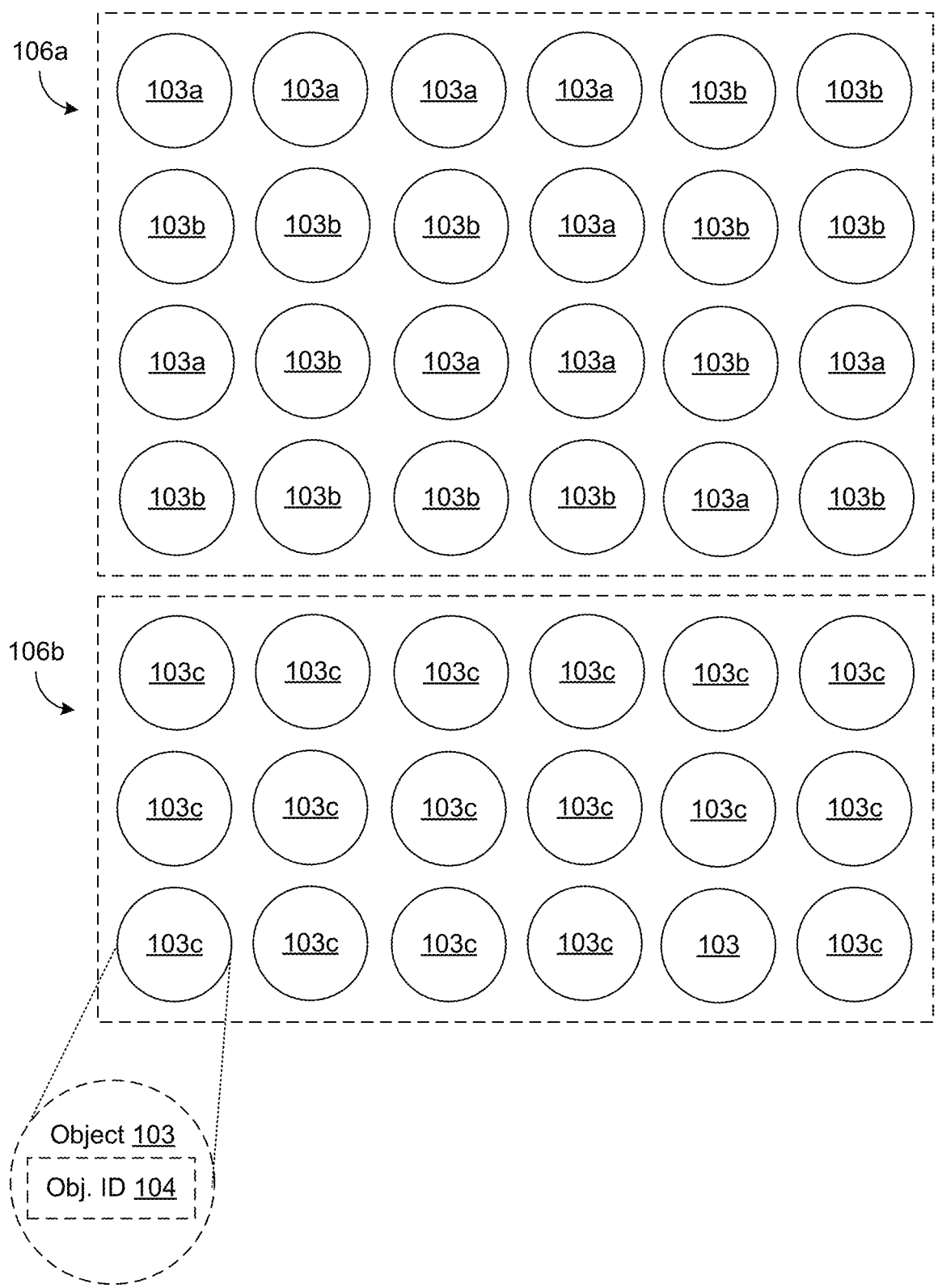
FIG. 1 is a drawing depicting one of several embodiments of the present disclosure.

FIG. 1 provides a visual illustration of the resulting operation of various embodiments of the present disclosure. A number of objects 103 can be stored in an object-based storage system. Each object 103 can include data itself, a variable amount of metadata, and an object identifier 104 such as a globally unique identifier or universally unique identifier (GUID or UUID). Objects 103 can represent any type of data. For example, an object 103 could represent an individual file. As another example, an object 103 could represent a row, column, or cell in a table of database.

Although individual objects 103 can be stored in an object-based storage system as unstructured data, collections of objects 103 could together form a larger data structure, such as a projected data structure 106. A projected data structure 106 is a data structure that is formed from, represented by, or mapped to a collection of individual objects 103. This larger data structure can therefore be viewed as being projected onto the collection of objects 103 that underly the projected data structure 106. As an example, if individual objects 103 represented individual rows in a table, then a respective projected data structure 106 would be the table formed by or represented by the collection of objects 103. As another example, if individual objects 103 represented individual rows in partition of a table (e.g., a partition of an APACHE HIVE® table), then a respective projected data structure 106 could be the partition of the table or the table itself (including any objects 103 within other partitions of the table).

As an object-based storage system is used, individual objects 103 may be read or otherwise accessed, as represented by individual objects 103a. Other objects 103, once stored in the object-based storage system, may not be accessed again or accessed for longer than a predefined period of time, such as objects 103b and objects 103c. Accordingly, objects 103b and objects 103c could be candidates for removal from an object-based storage system. However, objects 103b, though not recently accessed, could form a projected data structure 106a in combination with recently accessed objects 103a. As a result, removal of objects 103b would corrupt the projected data structure 106a. In contrast, projected data structure 106b exclusively comprises objects 103c. Accordingly, objects 103c could all be safely removed from the object-based storage system without corrupting the projected data structure 106b.

Figure 2:
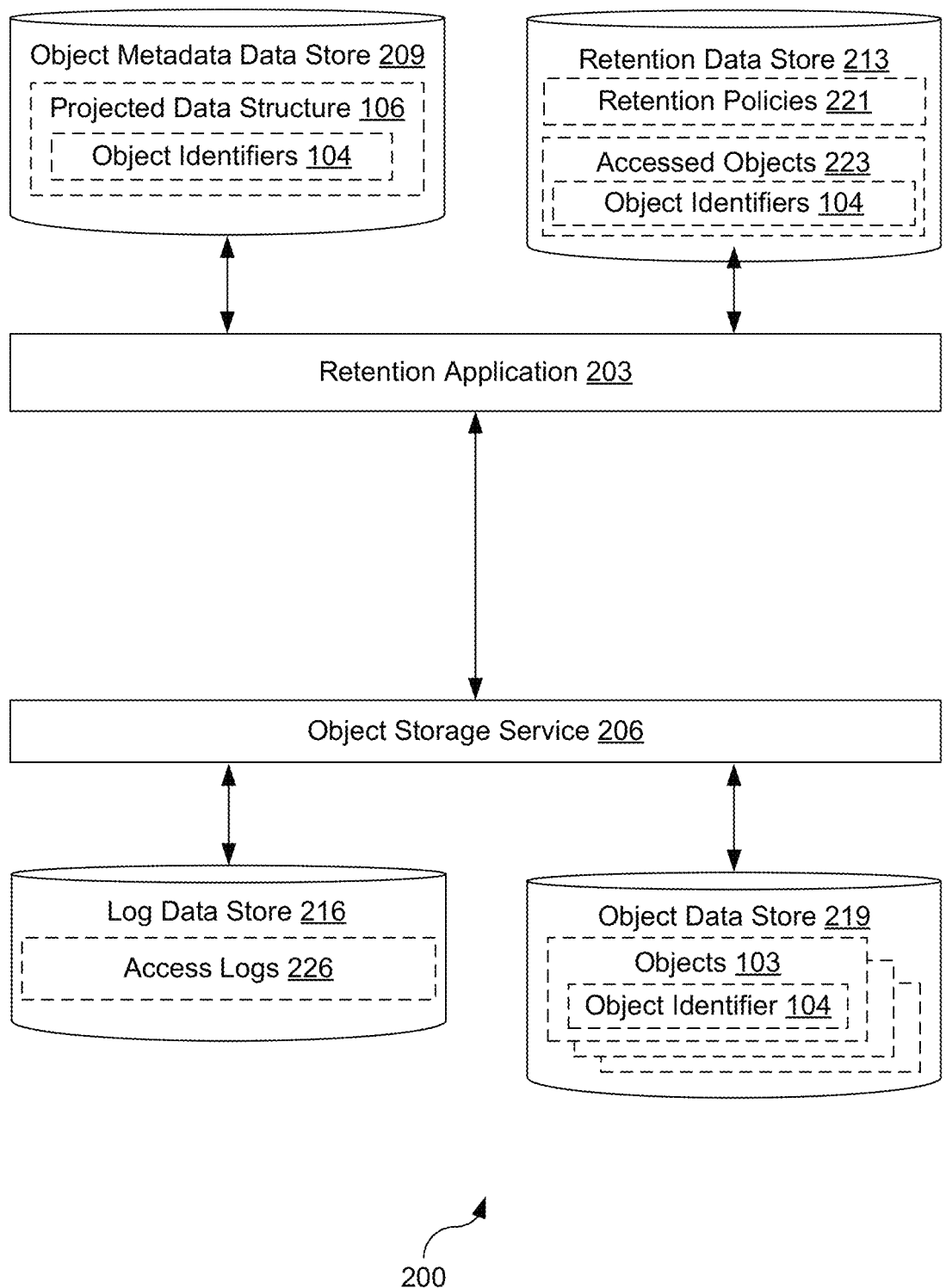
FIG. 2 is a drawing of a computing environment according to various embodiments of the present disclosure.

FIG. 2 depicts a computing environment 200 according to various embodiments of the present disclosure. The computing 200 can include one or more applications that are hosted by or executed in the computing environment 200. Examples of these applications include the retention application 203 and the object storage service 206. The computing environment 200 can also be configured to host one or more data stores, such as the object metadata data store 209, the retention data store 213, the log data store 216, and the object data store 219. Each data store (e.g., can the object metadata data store 209, the retention data store 213, the log data store 216, and the object data store 219) can be representative of a plurality of data stores, which can include relational databases or non-relational databases such as object-oriented databases, hierarchical databases, hash tables or similar key value data stores, as well as other data storage applications or data structures. Moreover, combinations of these databases, data storage applications, and/or data structures may be used together to provide a single, logical, data store.

The computing environment 200 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 200 can employ a plurality of computing devices that can be arranged in one or more server banks or computer banks or other arrangements. Such computing devices can be located in a single installation or can be distributed among many different geographical locations. For example, the computing environment 203 can include a plurality of computing devices that together can include a hosted computing resource, a grid computing resource or any other distributed computing arrangement. In some cases, the computing environment 203 can correspond to an elastic computing resource where the allotted capacity of processing, network, storage, or other computing-related resources can vary over time.

The individual computing devices can communicate with each other within the computing environment 200 using a network. The network can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network can also include a combination of two or more networks. Examples of networks can include the Internet, intranets, extranets, virtual private networks (VPNs), and similar networks.

The retention application 203 can be executed to evaluate objects 103 managed by the object storage service 206 and stored in the object data store 219 to determine what action, if any, should be taken with respect to the objects 103. This could include determining whether individual objects 103 should be deleted, retained, moved, and/or archived as specified by one or more applicable retention policies 221.

The object storage service 206 can be executed to provide an object store that manages data as objects 103. Each object 103 stored by the object storage service 206 can include data about itself and an object identifier 104 that uniquely identifies the object 103 from other objects 103 stored by the object storage service 206. Examples of object identifiers 104 include globally unique identifiers (GUIDs) and universally unique identifiers (UUIDs). Due to the object-based nature of the object storage service 206, users can often store large amounts of unstructured data in a cost-effective manner. The object storage service 206 can offer object storage, access, and retrieval through the network (e.g., through the use of a web or network-based API). Moreover, the object storage service 206 can provide different levels, tiers, or classifications of storage for objects 103. For instance, some objects 103 could be stored within a class of objects 103 that are always available and can be queried or retrieved immediately or nearly immediately in response to a request for the object 103. Other objects 103 could be stored within another class of objects 103 that may require longer periods of time to retrieve (e.g., minutes or hours), but for a reduced cost. Examples of object storage services 206 can include AMAZON WEB SERVICES S3, AMAZON GLACIER, MICROSOFT AZURE BLOB STORAGE, GOOGLE CLOUD STORAGE, and RACKSPACE FILES.

A retention policy 221 can represent a policy to be applied to individual objects 103 by the retention application 203 to determine how to process individual objects 103 stored in the object data store 219 and managed by the object storage service 206. For example, a retention policy 221 could specify a retention action to be performed on an object 103 if the object 103 meets one or more criteria specified by the retention policy 221. Examples of retention actions include deleting the object 103, moving the object 103 (e.g., to another location, another object storage service 206, or another tier or level of storage offered by the object storage service 206), or retaining the object 103 in the object data store 219 (which may be characterized as "retaining" the object 103 or taking no action with respect to the object 103). In some implementations, one or more retention policies 221 can be stored in the retention data store 213 for use by the retention application 203.

The retention policy 221 could also specify how frequently that objects 103 stored in the object data store 219 should be processed or evaluated by the retention application 203. For example, the retention policy 221 could specify that read or accessed objects 103 should be identified by the retention application 203 on a periodic basis or at predefined intervals (e.g., daily, every other day, weekly, etc.). As another example, the retention policy 221 could specify how frequently that retention actions should be performed on objects 103 (e.g., every day, every other day, every third day, every week, every other week, every month, etc.).

The accessed objects 223 can represent a set of objects 103 that the retention application 203 has identified as having been read or accessed within a predefined period of time based on an analysis of one or more access logs 226. The accessed objects 223 can be represented as a list, array, set, or other data structure that includes the individual object identifiers 104 of the objects 103 identified by the retention application 203.

An access log 226 can represent a log file created by the object storage service 206 that stores a record of operations performed on individual objects 103 in the object data store 219 by the object storage service 206. For example, each time the object storage service 206 reads an object 103 in the object data store 219 or writes an object 103 to the object data store 219, a record of the read of the write could be saved to an access log 226. Such a record could include the date and time that the read or write was performed. Other operations on objects 103 by the object storage service 206 could also be recorded in an access log 226.

The object metadata data store 209 can be used to store information about the relationships between individual objects 103 stored in the object data store 219. For example, for each projected data structure 106, the object metadata data store 209 could include or associate the object identifiers 104 of the objects 103 that are components of the projected data structure 106. Information about projected data structures 106 and the object identifiers 104 of objects 103 included in or associated with the projected data structures 106 can be stored in the object metadata data store 209 from a variety of sources. For example, some applications may implement and manage their own object metadata data store 209 (e.g., the metastore implemented by an instance of APACHE HIVE®). In other examples, the object metadata data store 209 may be maintained and managed by the retention application 203, and information about projected data structures 106 may be stored in the object metadata data store 209 by third-party applications.

Next, a general description of the operation of the various components of the computing environment 200 is provided. Although the following description provides an example of the interactions between the various components of the computing environment 200, other interactions are also possible. More detailed descriptions about the operation of the individual components of the computing environment 200 is provided in the discussion of FIGS. 3 and 4.

To begin, one or more objects 103 are stored in the object data store 219. These objects 103 could be used or processed as part of various workflows, applications, etc. Over time, the workflows or applications that utilize the objects 103 may cease to be executed or implemented. For instance, a data scientist training a machine-learning model may no longer use the training data uploaded to the object data store 219. Likewise, an application that relies on a database that is implemented using multiple objects 103 may cease operation. While, in some instances, the user or application may remove the objects 103 that they used, there is no guarantee that the user or the application will remove the objects 103 that they have used after the user or application is finished with them. Moreover, this requires the user or the application to operate in a cooperative manner with the object data store 219 and/or the other users or applications. This cooperation can be incredibly burdensome for the user or the application depending on the number of other users or applications that are using or sharing the objects 103.

Using the example of a data scientist training a machine-learning model, the data scientist could upload a large amount of data into the object data store 219. The data could be used to train a machine-learning model, such as a neural network. As the neural network classifies individual objects 103 in the object data store 219, the neural network can receive feedback regarding whether it's classification or prediction was correct. The neural network can then update the weights of individual perceptrons within the neural network to improve the accuracy of future predictions. The neural network could then be presented with the objects 103 in the training data set again to further refine its predictions or classifications. After multiple rounds of training using the objects 103 in the training data set, the resultant neural network would be trained to accurately make predictions or classifications about individual objects 103 that it has not previously evaluated.

Moreover, the same objects 103 in the training data set could be used to train different machine-learning models (e.g., different neural networks) to see which machine-learning model, once trained, offered the best accuracy or the best performance. Similarly, the objects 103 in the training data set could be used to train multiple revisions of the same machine-learning model, such as when layers of perceptrons or connections between perceptrons are adjusted, added, or removed in order to refine the underlying neural network of a machine-learning model. Accordingly, objects 103 may be accessed repeatedly within the training data to train multiple machine-learning models or multiple revisions of the same machine-learning model, but the individual objects 103 or groups of objects 103 may be accessed at different times or different intervals. Therefore, premature or inadvertent deletion of an object 103 from the training data set could impact the performance or accuracy of the machine-learning models being trained.

Accordingly, the retention application 203 can analyze the objects 103 stored in the object data store 219 to determine which objects are candidates for archival (e.g., deletion, relocation, reclassification, etc.). To do this, the retention application 203 can identify candidate objects 103 that have not been read or otherwise accessed for more than an amount of time specified by a retention policy 221 and/or were created prior to a date specified by the retention policy 221. The retention application can then identify the projected data structures 106 that the objects 103 are members of, if any. If none of the objects 103 that are components of a projected data structure 106 have been accessed or read within the specified period of time, then the retention application 203 can delete, move, reclassify, or otherwise perform a retention action on the objects 103. However, if an object 103 that has not been accessed within the specified period of time is a member of a projected data structure 106 that contains other objects 103 that have been accessed within the specified period of time, then the retention application 203 can determine that the object 103 is still in use based on its relationship to the recently accessed object 103. Such an object 103 would be retained in the object data store 219. For example, if an object 103 had not been accessed within a specified period of time, but the object 103 was part of a table or partition of a table (e.g., an APACHE HIVE® partition) that contained objects 103 that had been accessed within the specified period of time, then the object 103 could be retained in the object data store 219.

Figure 3:
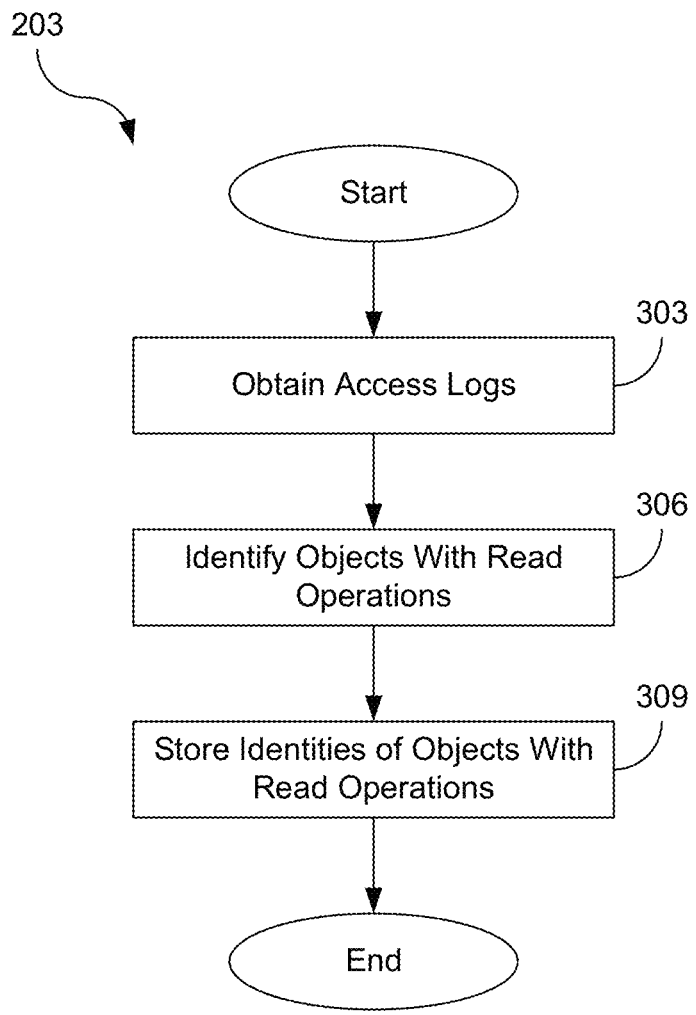
FIG. 3 is a flowchart illustrating one example of functionality implemented as portions of an application executed in the computing environment of FIG. 2 according to various embodiments of the present disclosure.

Referring next to FIG. 3, shown is a flowchart that provides one example of the operation of a portion of the retention application 203. The flowchart of FIG. 3 provides merely an example of the many different types of functional arrangements that can be employed to implement the operation of the depicted portion of the retention application 203. As an alternative, the flowchart of FIG. 3 can be viewed as depicting an example of elements of a method implemented within the computing environment 200.

Beginning with block 303, the retention application 203 obtain copies of access logs 226 (e.g., log files) from the log data store 216. This could be done on a periodic basis (e.g., daily, weekly, monthly, etc.). Upon obtaining the copies of the access logs 226, the retention application 203 may also perform an action to prevent it from obtaining the same access logs 226 again. For example, the retention application 203, after obtaining copies of the access logs 226, could mark the access logs 226 as read, delete the access logs 226, or perform some action. In other examples, the retention application 203 could instead copy or obtain access logs 226 or portions of access logs 226 that corresponded to a predefined period or interval of time. For example, if the process depicted in FIG. 3 were performed on a daily basis, then the retention application 203 could obtain or request access logs 226, or portions of access logs 226, for the current or previous day.

Then at block 306, the retention application 203 can analyze the access logs 226 to determine which objects 103 in the object data store 219 have been read. For example, the retention application 203 could search, sort, or otherwise filter the access logs 226 according to one or more criteria. For instance, the retention application 203 could use a regular expression to parse the access logs 226 to identify individual objects 103 which had been read.

Next at block 309, the retention application 203 can store the object identifiers 104 of objects 103 that have been identified at block 306 as having been read or otherwise accessed, as well as the date and/or time that the objects 103 were read or otherwise accessed. For example, the retention application 203 could store the object identifiers 104 (e.g., GUID or UUID) of the objects 103 that had been read or accessed in a list or set of accessed objects 223 in the retention data store 213. These accessed objects 223 could then be used to identify projected data structures 106 when determining whether to perform a retention action on individual objects 103 in the object data store 219 or to retain the individual objects 103 in the object data store 219 for future use.

Figure 4:
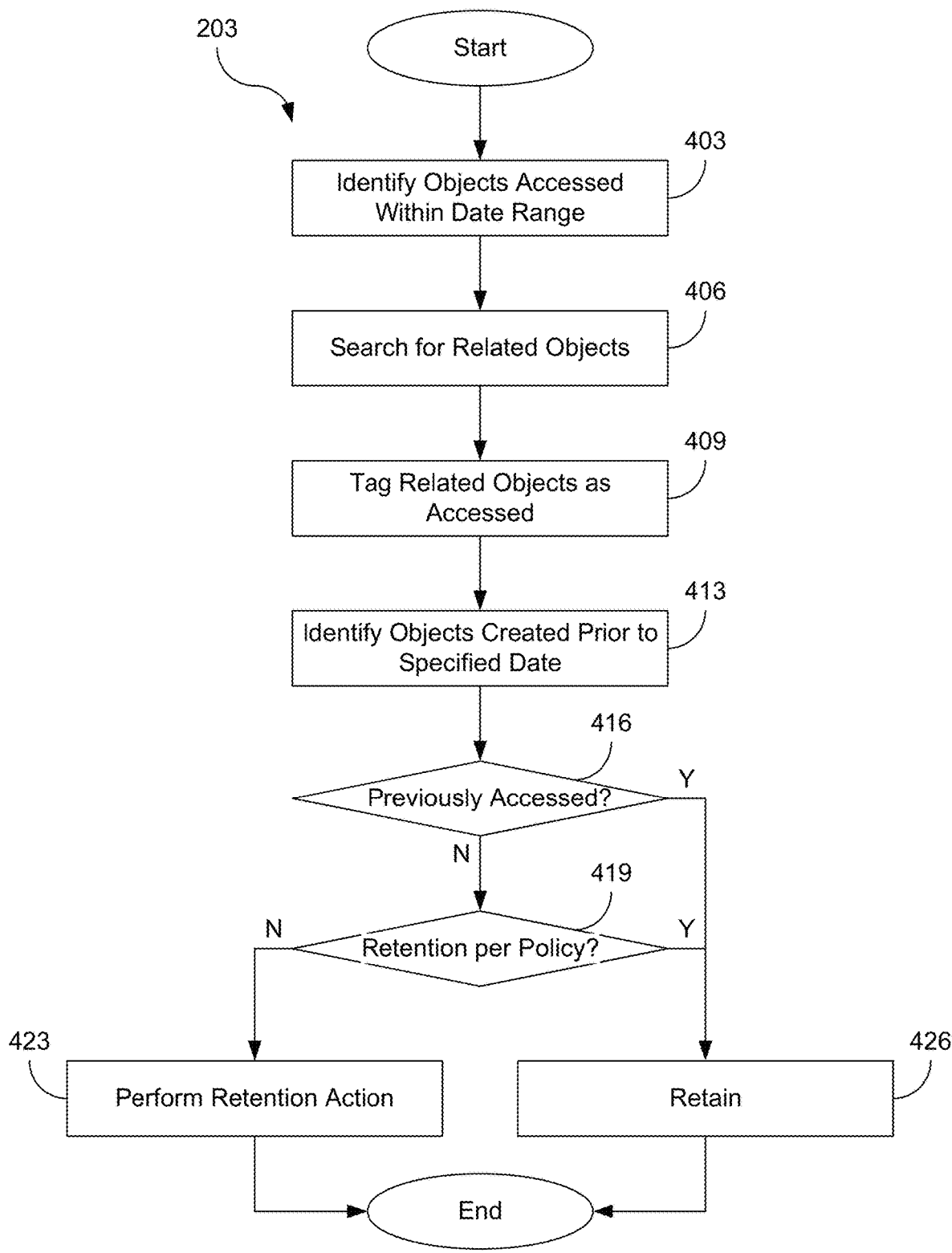
FIG. 4 is a flowchart illustrating one example of functionality implemented as portions of an application executed in the computing environment of FIG. 2 according to various embodiments of the present disclosure.

Referring next to FIG. 4, shown is a flowchart that provides one example of the operation of a portion of the retention application 203. The flowchart of FIG. 4 provides merely an example of the many different types of functional arrangements that can be employed to implement the operation of the depicted portion of the retention application 203. As an alternative, the flowchart of FIG. 4 can be viewed as depicting an example of elements of a method implemented within the computing environment 200.

Beginning with block 403, the retention application 203 can identify objects 103 stored in the object data store 219 that were accessed within a predefined date range. For example, the retention application 203 could analyze the accessed objects 223 to identify all objects 103 with a respective date or timestamp that fell within the predefined date range. The predefined date range could be specified in a retention policy 221, could be provided to the retention application 203 manually (e.g., as an argument provided at the beginning of the process depicted in FIG. 4), or through other approaches.

Then at block 406, the retention application 203 can search for related objects 103. For example, for each object 103 identified at block 403, the retention application 203 could search the object metadata data store 209 for a projected data structure that includes the identified object 103. This could be done by search for any projected data structures 106 that include an object identifier 104 that matched an object identifier 104 among the accessed objects 223. The retention application 203 could then identify any other objects 103 in the projected data structure 106 as being related objects 103. For example, if the projected data structure 106 were a table, then objects 103 in the list of accessed objects 223 (e.g., objects 103a) could represent rows of the table that had been recently accessed (e.g., in response to a query), while the related objects 103 (e.g., objects 103b) could include those rows in the table that had not been recently accessed (e.g., because they failed to match the parameters of the query). Similarly, if the projected data structure 106 were a partition of a table, then the objects 103 in the list of accessed objects 223 could represent rows of the partition of the table that had been recently accessed, while the related objects 103 could include those rows in the partition of the table or in other partitions of the table that had not been recently accessed (e.g., because they failed to match the parameters of the query).

Next at block 409, the retention application 203 can tag, mark, flag, or otherwise record the related objects 103 as having been accessed. As one example, the retention application 203 could add the object identifiers 104 of related objects 103 to the list object identifiers 104 of the accessed objects 223. As another example, the retention application 203 could create a temporary data structure that includes the object identifiers 104 of both the accessed objects 223 and the related objects 103 from the projected data structure 106 that were previously identified at block 406.

Moving on to block 413, the retention application 203 can identify all objects 103 in the object data store 219 that were created prior to a specified date. The specified date could be specified in the retention policy 221, could be provided to the retention application 203 manually (e.g., as an argument provided at the beginning of the process depicted in FIG. 4), or through other approaches. The specified date could also be a static date (e.g., Jan. 1, 2021) or could be a rolling date (e.g., anything older than one-week, one-month, three-months, six-months, one-year, etc.). To identify the objects 103, the retention application 203 could provide the specified date to the object storage service 206 as part of a request for matching objects 103. In response, the retention application 203 could receive from the object storage service 206 the object identifiers 104 of all objects 103 in the object data store 219 that were created prior to the specified date.

Proceeding to block 416, the retention application 203 can evaluate each object 103 identified at block 413 to determine whether that object 103 had been previously accessed. For example, the retention application 203 could determine whether unique identifier of the object 103 identified at block 413 matches the unique identifier of an object 103 identified at block 403 (e.g., is a previously accessed object 223) or at block 409 (e.g., is included in the same projected data structure 106 as a previously accessed object 223). If the object 103 has been previously accessed or is part of the same projected data structure 106 as a previously accessed object 223, then the process for that object skips to block 426. Otherwise, the process continues to block 419 for the object 103.

If the process continues to block 419, then the retention application 203 can determine whether to retain the object 103 according to the retention policy 221. For example, a retention policy 221 could specify that any objects 103 should not be retained that were identified at block 413 (e.g., older than a specified date) and have neither been recently accessed, as determined at block 403, nor are a related object 103 that is part of a projected data structure 106 that includes an accessed object 223, as determined at blocks 406 and 409. As another example, the retention policy 221 could further specify other criteria (e.g., size, object type, owner, etc.) that provide a basis for the retention application 203 to determine whether to retain the object 103 in the object data store 219. For each object 103 that the retention application 203 determines should be not be retained, the process proceeds to block 423 for that object 103. However, for each object 103 that the retention application 203 determines should be retained in the object data store 219, the process proceeds to block 426.

If the process proceeds to block 423, then the retention application 203 can perform a retention action as specified by the retention policy 221. For example, the retention application 203 could instruct the object storage service 206 to delete the object 103 from the object data store 219. As another example, the retention application 203 could instruct the object storage service 206 to move the object 103 to a different level or tier of storage (e.g., a lower-cost storage tier that has significantly longer access times). Once the retention application 203 causes the object storage service 206 to perform the retention action, then the process can end.

However, if the process proceeds to block 426, then the retention application 203 can determine that the object 103 is to be retained. For example, the object 103 is either currently in active use or is part of an actively used projected data structure 106. Accordingly, no further action is taken by the retention application 203 on the object 103 and the process can end.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 200.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X and/or Y; X and/or Z; Y and/or Z; X, Y, and/or Z, etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   a memory; and
   at least one processor coupled to the memory and configured to:
   identify a data structure that includes a first set of data objects and a second set of data objects;
   determine that metadata corresponding to the first set of data objects does not satisfy a retention criteria, wherein the retention criteria is part of a retention policy, wherein the retention policy indicates a retention action to be performed on a set of data objects when metadata corresponding to the set of data objects satisfies the retention criteria;
   in response to determining that the metadata corresponding to the first set of data objects does not satisfy the retention criteria, retain the first set of data objects;
   determine that metadata corresponding to the second set of data objects satisfies the retention criteria;
   determine that altering the second set of data objects according to the retention policy corrupts the data structure; and
   in response to determining that the metadata corresponding to the second set of data objects satisfies the retention criteria and determining that altering the second set of data objects according to the retention policy corrupts the data structure, retain the second set of data objects to prevent the data structure from being corrupted.

2. The system of claim 1, wherein the retention criteria is a date of last access specified by the retention policy and the metadata corresponding to the set of data objects indicates a date the set of objects was last accessed.

3. The system of claim 1, wherein the retention action is an archival action to move the set of data objects from a first level of data storage to a second level of data storage.

4. The system of claim 3, wherein a set of data objects stored in the first level of data storage is retrieved faster than a set of data objects stored in the second level of data storage.

5. The system of claim 1, wherein the retention action is a deletion action.

6. The system of claim 1, wherein the at least one processor is further configured to:
   determine that metadata corresponding with a third set of data objects satisfies the retention criteria;
   determine that altering the third set of data objects according to the retention policy does not corrupt the data structure; and
   apply the retention action to the third set of data objects.

7. The system of claim 1, wherein the retention criteria is based on an owner identity and wherein the retention action is applied to a set of data objects corresponding to the owner identity.

8. A method, comprising:
   identifying a data structure that includes a first set of data objects and a second set of data objects;
   determining that metadata corresponding to the first set of data objects does not satisfy a retention criteria, wherein the retention criteria is part of a retention policy, wherein the retention policy indicates a retention action to be performed on a set of data objects when metadata corresponding to the set of data objects satisfies the retention criteria;
   in response to determining that the metadata corresponding to the first set of data objects does not satisfy the retention criteria, retaining the first set of data objects;
   determining that metadata corresponding to the second set of data objects satisfies the retention criteria;
   determining that altering the second set of data objects according to the retention policy corrupts the data structure; and
   in response to determining that the metadata corresponding to the second set of data objects satisfies the retention criteria and determining that altering the second set of data objects according to the retention policy corrupts the data structure, retaining the second set of data objects to prevent the data structure from being corrupted.

9. The method of claim 8, wherein the retention criteria is a date of last access specified by the retention policy and the metadata corresponding to the set of data objects indicates a date the set of objects was last accessed.

10. The method of claim 8, wherein the retention action is an archival action to move the set of data objects from a first level of data storage to a second level of data storage.

11. The method of claim 10, wherein a set of data objects stored in the first level of data storage is retrieved faster than a set of data objects stored in the second level of data storage.

12. The method of claim 8, wherein the retention action is a deletion action.

13. The method of claim 8, further comprising:
   determining that metadata corresponding with a third set of data objects satisfies the retention criteria;
   determining that altering the third set of data objects according to the retention policy does not corrupt the data structure; and
   applying the retention action to the third set of data objects.

14. The method of claim 8, wherein the retention criteria is based on an owner identity and wherein the retention action is applied to a set of data objects corresponding to the owner identity.

15. A non-transitory computer-readable device having instructions stored thereon that, when executed by at least one computing device, cause the at least one computing device to perform operations comprising:
   identifying a data structure that includes a first set of data objects and a second set of data objects;
   determining that metadata corresponding to the first set of data objects does not satisfy a retention criteria, wherein the retention criteria is part of a retention policy, wherein the retention policy indicates a retention action to be performed on a set of data objects when metadata corresponding to the set of data objects satisfies the retention criteria;
   in response to determining that the metadata corresponding to the first set of data objects does not satisfy the retention criteria, retaining the first set of data objects;
   determining that metadata corresponding to the second set of data objects satisfies the retention criteria;
   determining that altering the second set of data objects according to the retention policy corrupts the data structure; and
   in response to determining that the metadata corresponding to the second set of data objects satisfies the retention criteria and determining that altering the second set of data objects according to the retention policy corrupts the data structure, retaining the second set of data objects to prevent the data structure from being corrupted.

16. The non-transitory computer-readable device of claim 15, wherein the retention criteria is a date of last access specified by the retention policy and the metadata corresponding to the set of data objects indicates a date the set of objects was last accessed.

17. The non-transitory computer-readable device of claim 15, wherein the retention action is an archival action to move the set of data objects from a first level of data storage to a second level of data storage.

18. The non-transitory computer-readable device of claim 17, wherein a set of data objects stored in the first level of data storage is retrieved faster than a set of data objects stored in the second level of data storage.

19. The non-transitory computer-readable device of claim 15, wherein the retention action is a deletion action.

20. The non-transitory computer-readable device of claim 15, further comprising:
   determining that metadata corresponding with a third set of data objects satisfies the retention criteria;
   determining that altering the third set of data objects according to the retention policy does not corrupt the data structure; and
   applying the retention action to the third set of data objects.

* * * * *